US011425324B2

(12) United States Patent
Weiss et al.

(10) Patent No.: US 11,425,324 B2
(45) Date of Patent: Aug. 23, 2022

(54) TIME-OF-FLIGHT DOWN-UP SAMPLING USING A COMPRESSED GUIDE

(71) Applicant: SAMSUNG ELECTRONICS CO., LTD., Suwon-si (KR)

(72) Inventors: Taeer Weiss, Suwon-si (KR); Roy Yam, Suwon-si (KR); Gal Bitan, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 33 days.

(21) Appl. No.: 16/908,722

(22) Filed: Jun. 22, 2020

(65) Prior Publication Data

US 2021/0400217 A1    Dec. 23, 2021

(51) Int. Cl.
*H04N 5/369* (2011.01)
*H04N 5/222* (2006.01)
*H04N 5/357* (2011.01)
*G01S 17/894* (2020.01)

(52) U.S. Cl.
CPC ....... *H04N 5/36965* (2018.08); *G01S 17/894* (2020.01); *H04N 5/2226* (2013.01); *H04N 5/357* (2013.01)

(58) Field of Classification Search
None
See application file for complete search history.

(56) References Cited

U.S. PATENT DOCUMENTS

| 8,134,637 | B2 * | 3/2012 | Rossbach | G01S 17/894 |
| | | | | 348/348 |
| 10,482,618 | B2 * | 11/2019 | Jain | G06T 7/13 |
| 10,510,155 | B1 * | 12/2019 | Islam | H04N 13/271 |
| 2013/0051658 | A1 * | 2/2013 | Hwang | G06T 7/187 |
| | | | | 382/154 |
| 2014/0168362 | A1 * | 6/2014 | Hannuksela | H04N 13/161 |
| | | | | 348/43 |
| 2015/0235351 | A1 * | 8/2015 | Mirbach | G06T 5/002 |
| | | | | 382/154 |
| 2019/0058859 | A1 * | 2/2019 | Price | H04N 13/111 |

OTHER PUBLICATIONS

Miles Hansard, et al. "Time-of-Flight Cameras Principles, Methods and Applications," Springer, Nov. 2012 (pp. 1-102).
Johaness Kopf, "Joint Bilateral Upsampling," ACM Transactions of Graphics (TOG) vol. 26. No. 3, ACM, 2007, (pp. 1-5).
Om Prakash Gangwal, "Depth Map Post-Processing for 3D-TV," IEEE, 2009 (pp. 1-2).

* cited by examiner

*Primary Examiner* — James M Hannett
(74) *Attorney, Agent, or Firm* — F. Chau & Associates, LLC

(57) ABSTRACT

A method for time-of-flight (ToF) guided down-up sampling includes calculating a guide function from a full resolution output of a ToF sensor, downsampling the full resolution output by a predetermined scaling factor, calculating a downsampled depth data from the downsampled output and upsampling the downsampled depth data to full resolution using the full resolution guide function.

19 Claims, 5 Drawing Sheets

TIME-OF-FLIGHT DOWN-UP SAMPLING USING A COMPRESSED GUIDE

BACKGROUND

Technical Field

Embodiments of the present disclosure are directed to time-of-flight sensors. More particularly, embodiments of the present disclosure are directed to a runtime reduction method for time-of-flight sensors by performing low resolution processing and up scaling using a high resolution guide.

Discussion of the Related Art

Time of flight (ToF) is the measurement of the time taken by an object, particle or wave to travel a distance through a medium. This information can then be used to establish a time standard as a way to measure velocity or path length, or as a way to learn about the particle or medium's properties. A time-of-flight (ToF) camera is a range imaging camera system that can resolve the distance between the camera and a subject for each point of the image, by measuring the round trip time of an artificial light signal provided by a laser or an LED.

Indirect ToF depth measuring systems use a light source to emit a continuous modulated light wave, such as a sinusoidal or other wave form. A ToF sensor detects this modulated light reflected from objects in an observed scene. The received signal that returns from the scene to the sensor is correlated with the original modulation signal. This correlation is sampled at 0°, 90°, 1800 and 270°, and these samples are the phases $A_0$, $A_{90}$, $A_{180}$ and $A_{270}$. To clarify, assuming ToF projector signal is of the form: $A(1-\cos(\omega t + \varphi))$, the sampling of the correlation is mathematically represented by:

$$\int_{\frac{T}{4}i}^{\frac{T}{4}i+T_{int}} (B + A + A\sin(\omega t + \varphi))dt,$$

where B is the ambient which is assumed to be constant during the integration time, $A_0$ is obtained by setting i=0 in the above formula, $A_{90}$ by setting i=1, $A_{180}$ by setting i=2, and $A_{270}$ by i=3, and $$T_{int} = \frac{T}{2} \text{ or } T_{int} = \frac{T}{4}$$

depending on the sensor type. $A_0$, $A_{90}$, $A_{180}$, $A_{270}$ are used to calculate the phase shift between the emitted modulated light and the received modulated light. From this phase shift, the physical distance, i.e., the depth, between the ToF sensor and the scene can be calculated. FIG. 1 illustrates transmitted and reflected modulated light for a ToF depth measuring system, and $\varphi$ is the phase shift between the transmitted and received signals.

The phase shift can be calculated from:

$$\varphi = \arctan\left(\frac{A_{270} - A_{90}}{A_0 - A_{180}}\right) + \varphi_0 + 2\pi k, k = 0, 1, 2, \ldots,$$

where $\varphi_0$ is an additional constant offset stems from the sensor type or configuration. For example, is different according to the $T_{int}$, and the depth is proportional to the phase shift:

$$d = \frac{c}{4\pi f_{mod}}\varphi,$$

where c is the speed of light, and $f_{mod}$ is the modulation frequency of the modulated light; and the received amplitude can be calculated from:

$$\text{amplitude} = \frac{1}{2}\sqrt{(A_0 - A_{180})^2 + (A_{90} - A_{270})^2}.$$

The results of the ToF measurements can be represented as 3-dimensional data, a set of points in a Cartesian coordinate system (x, y, z), known as a point cloud. If a certain pixel measures a depth value of d, this depth value is projected on the direction that pixel is "looking into", which is known from the properties of the sensor and the lens, to determine the x, y, and z coordinates of the "point" in the object that is observed by that pixel.

FIG. 2 illustrates the connection between depth and (X, Y, Z) in a specific pixel, and shows a pixel (u, v) on a sensor 22, a lens 20 a focal length f from the sensor 22, and a pixel projection (X, Y, Z), where r is the depth. The coordinates (u, v) are the horizontal and vertical indices of the pixel, and (X, Y, Z) are the Cartesian coordinates of the observed part of the object, in a Cartesian coordinate system with origin at the center of the sensor plane. The connection between r, X, Y, and Z is expressed by $$Z = \frac{r}{\sqrt{1 + \tan^2(\alpha_x) + \tan^2(\alpha_y)}},$$

$$X = Z\tan(\alpha_x),$$

$$Y = Z\tan(\alpha_y),$$

where $\alpha_x$ is the horizontal offset angle of the pixel projection, and $\alpha_y$ is the vertical offset angle of the pixel projection.

In many ToF systems, the sensor outputs 4 measured phases $A_0$, $A_{90}$, $A_{180}$ and $A_{270}$ and provides them to an image signal processing (ISP) chain. The ISP chain comprises several different processing algorithms that include spherical depth and point cloud calculations. The processing can be quite complex depending on the physical artifacts of the sensor, and includes spatial and temporal noise filtering, calibrations, flying pixels corrections, etc.

ToF sensors face a constant tradeoff of quality versus computation resources, and high resolution exacerbates this tradeoff by making the processing more expensive for the same quality.

SUMMARY

Exemplary embodiments of the present disclosure are directed to systems and methods for reducing ISP processing time by a down-up sampling solution in which the 4 phases are down sampled, processing the down sampled data, and then at the end of the ISP chain, performing a guided up sampling algorithm using compressed data at full resolution to obtain a full resolution depth output.

According to an embodiment of the disclosure, there is provided a method for time-of-flight (ToF) guided down-up sampling that includes the steps of calculating a guide function from a full resolution output of a ToF sensor, downsampling the full resolution output by a predetermined scaling factor, calculating a downsampled depth data from the downsampled output, and upsampling the downsampled depth data to full resolution using the full resolution guide function.

According to a further embodiment of the disclosure, the method includes filtering the full resolution output.

According to a further embodiment of the disclosure, the method includes processing the downsampled output in an image signal processing (ISP) chain, and calculating a full resolution point cloud from the full resolution depth data.

According to a further embodiment of the disclosure, the output includes a set of phase measurements $A_0$, $A_{90}$, $A_{180}$ and $A_{270}$ that are samples of a correlation of a received signal and a reference signal, and are represented as four images at the full resolution output of the ToF sensor.

According to a further embodiment of the disclosure, the method includes calculating first and second phase differences from the full resolution output, wherein the guide function is defined as $$\frac{A_0 + A_{90} + A_{180} + A_{270}}{4},$$

the first phase difference is defined as $A_{270}-A_{90}$ and the second phase difference is defined as $A_0-A_{180}$.

According to a further embodiment of the disclosure, upsampling the downsampled depth data to full resolution includes representing the downscaled depth data in an upscaled domain according to $$\hat{Z}[i, j] = z^d\left[\frac{i}{\alpha}, \frac{j}{\alpha}\right],$$

wherein $\hat{Z}$ is the depth data on the upscaled domain, $z^d$ is the downscaled depth data, and $\alpha$ is the down-up sampling factor, and reconstructing the full resolution depth data according to $$\hat{Z}_{i,j} = \frac{\sum_{n \in suppi} \sum_{m \in suppj} \hat{Z}_{n,m} W_S(Guide_{n,m}, Guide_{i,j}) Mask_{n,m}}{\sum_{n \in suppi} \sum_{m \in suppj} W_S(Guide_{n,m}, Guide_{i,j}) Mask_{n,m}},$$

wherein supp i denotes a support of index i in a vertical direction, supp j denotes a support of index j in a horizontal direction, $\hat{Z}_{i,j}$ is the up sampled depth data at pixel (i,j) on the up sampled domain, (n,m) is an index of the downscaled depth data on the upscaled domain in the support of (i,j), $W_S$ is a similarity weight between pixel (n,m) and pixel (i,j) calculated based on the guide function, $Guide_{n,m}$ and $Guide_{i,j}$ are the guides for pixel (n,m) and pixel (i,j), respectively, in the upscaled domain, and $Mask_{n,m}$ has values of 1 or 0 and determines whether or not to include a down sampled pixel (n,m) in the reconstruction of pixel (i,j).

According to a further embodiment of the disclosure, the weights $W_S(Guide_{n,m}, Guide_{i,j})$ are Gaussian functions defined by the formula $$\exp\left\{\frac{-|Guide_{n,m} - Guide_{i,j}|^2}{2\sigma_S^2}\right\},$$

wherein $\sigma$ is proportional to a square root of $A_0+A_{90}+A_{180}+A_{270}$ and scaled by a predetermined tunable factor.

According to a further embodiment of the disclosure, $Mask_{n,m}$ is calculated based on depth similarities between adjacent pixels or other external information, wherein $Mask_{n,m}$ eliminates unreliable and flying pixels from the reconstruction of the full resolution depth data.

According to a further embodiment of the disclosure, the depth data is one of a spherical depth, Cartesian coordinates, or a mask.

According to another embodiment of the disclosure, there is provided a method for time-of-flight (ToF) guided down-up sampling, including the steps of providing downsampled depth data from first and second phase differences calculated from a full resolution output of a ToF sensor, and upsampling the downsampled depth data to full resolution using a full resolution guide function calculated from the full resolution output of a ToF sensor. Upsampling the downsampled depth data to full resolution includes representing the downscaled depth data in an upscaled domain according to $$\hat{Z}[i, j] = z^d\left[\frac{i}{\alpha}, \frac{j}{\alpha}\right],$$

wherein $\hat{Z}$ is a depth on the upscaled domain, $z^d$ is a downscaled depth, and $\alpha$ is a down-up sampling factor, and reconstructing the full resolution depth data according to $$\hat{Z}_{i,j} = \frac{\sum_{n \in suppi} \sum_{m \in suppj} \hat{Z}_{n,m} W_S(Guide_{n,m}, Guide_{i,j}) Mask_{n,m}}{\sum_{n \in suppi} \sum_{m \in suppj} W_S(Guide_{n,m}, Guide_{i,j}) Mask_{n,m}},$$

wherein supp i denotes a support of index i in a vertical direction, supp j denotes a support of index j in a horizontal direction, $\hat{Z}_{i,j}$ is an up sampled depth at pixel (i,j), (n,m) is an index of downscaled depth data on the upscaled domain in the support of (i,j), $W_S$ is a similarity weight between pixel (n,m) and pixel (i,j) calculated based on the guide function, $Guide_{n,m}$ and $Guide_{i,j}$ are the guides for pixel (n,m) and pixel (i,j), respectively, in the upscaled domain, and $Mask_{n,m}$ has values of 1 or 0 and determines whether or not to include a down sampled pixel (n,m) in the reconstruction of pixel (i,j).

According to a further embodiment of the disclosure, the full resolution output of the ToF sensor includes a set of phase measurements $A_0$, $A_{90}$, $A_{180}$ and $A_{270}$ that are samples of a correlation of a received signal and a reference signal, and are represented as four images at the full resolution output of the ToF sensor.

According to a further embodiment of the disclosure, the method includes calculating the guide function and first and second phase differences from the full resolution output of the ToF sensor, wherein the guide function is defined as $$\frac{A_0 + A_{90} + A_{180} + A_{270}}{4},$$

the first phase difference is defined as $A_{270}-A_{90}$ and the second phase difference is defined as $A_0-A_{180}$, downsampling the first and second phase differences by the predetermined scaling factor, and calculating the downsampled depth data from the downsampled first and second phase differences.

According to a further embodiment of the disclosure, the method includes calculating a full resolution point cloud from the full resolution depth data.

According to another embodiment of the disclosure, there is provided a non-transitory program storage device readable by a computer, tangibly embodying a program of instructions executed by the computer to perform a method for time-of-flight (ToF) guided down-up sampling, where the method includes the steps of receiving a set of full resolution ToF phase measurements $A_0$, $A_{90}$, $A_{80}$ and $A_{270}$ that are samples of a correlation of a received signal and a reference signal, and are represented as four images, calculating a guide function and first and second phase differences from the full resolution phase measurements output by the ToF sensor, downsampling the first and second phase differences by a predetermined scaling factor, calculating downsampled depth data from the downsampled first and second phase differences, and up sampling the downsampled depth data to full resolution using the guide function.

According to a further embodiment of the disclosure, the method includes filtering said full resolution first and second phase differences.

According to a further embodiment of the disclosure, the method includes calculating a full resolution point cloud from the full resolution depth data.

According to a further embodiment of the disclosure, the set of phase measurements $A_0$, $A_{90}$, $A_{180}$ and $A_{270}$ are sampled at 0°, 90°, 180° and 270°, the guide function is defined as $$\frac{A_0 + A_{90} + A_{180} + A_{270}}{4},$$

the first phase difference is defined as $A_{270}-A_{90}$ and the second phase difference is defined as $A_0-A_{180}$.

According to a further embodiment of the disclosure, upsampling the downsampled depth data to full resolution includes representing the downscaled depth data in an upscaled domain according to $$\hat{Z}[i,j] = z^d\left[\frac{i}{\alpha}, \frac{j}{\alpha}\right],$$

wherein $\hat{Z}$ is a depth on the upscaled domain, $z^d$ is a downscaled depth, and $\alpha$ is the down-up sampling factor, and reconstructing the full resolution depth data according to $$\hat{Z}_{i,j} = \frac{\Sigma_{n \in suppi}\Sigma_{m \in suppj}\hat{Z}_{n,m}W_S(Guide_{n,m}, Guide_{i,j})Mask_{n,m}}{\Sigma_{n \in suppi}\Sigma_{m \in suppj}W_S(Guide_{n,m}, Guide_{i,j})Mask_{n,m}},$$

wherein supp i denotes a support of index i in a vertical direction, supp j denotes a support of index j in a horizontal direction, $\hat{Z}_{i,j}$ is the up sampled depth at pixel (i,j), (n,m) is an index of the downscaled depth data on the upscaled domain in the support of (i,j), $W_S$ is a similarity weight between pixel (n,m) and pixel (i,j) calculated based on the guide function, $Guide_{n,m}$ and $Guide_{i,j}$ are the guides for pixel (n,m) and pixel (i,j), respectively, in the upscaled domain, and $Mask_{n,m}$ has values of 1 or 0 and determines whether or not to include a down sampled pixel (n,m) in the reconstruction of pixel (i,j).

According to a further embodiment of the disclosure, the weights $W_S(Guide_{n,m}, Guide_{i,j})$ are Gaussian functions defined by the formula $$\exp\left\{\frac{-|Guide_{n,m} - Guide_{i,j}|^2}{2\sigma_S^2}\right\},$$

wherein $\sigma$ is proportional to a square root of $A_0+A_{90}+A_{180}+A_{270}$ and scaled by a predetermined tunable factor.

According to a further embodiment of the disclosure, $Mask_{n,m}$ is calculated based on depth similarities between adjacent pixels or other external information, wherein $Mask_{n,m}$ eliminates unreliable and flying pixels from the reconstruction of the full resolution depth data.

DETAILED DESCRIPTION OF EXEMPLARY EMBODIMENTS

Figure 1:
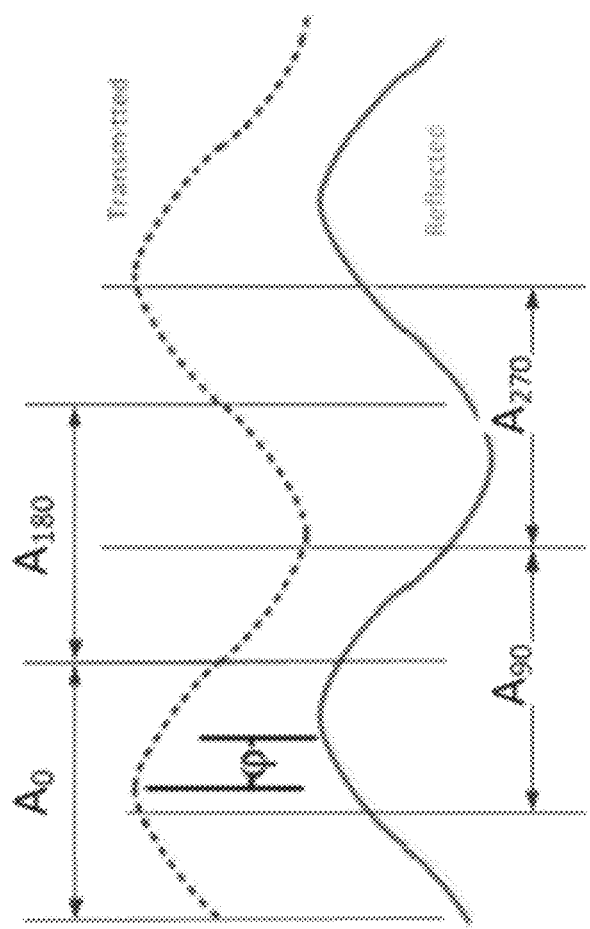
FIG. 1 illustrates transmitted and reflected modulated light for a ToF depth measuring system, according to an embodiment of the disclosure.
Figure 2:
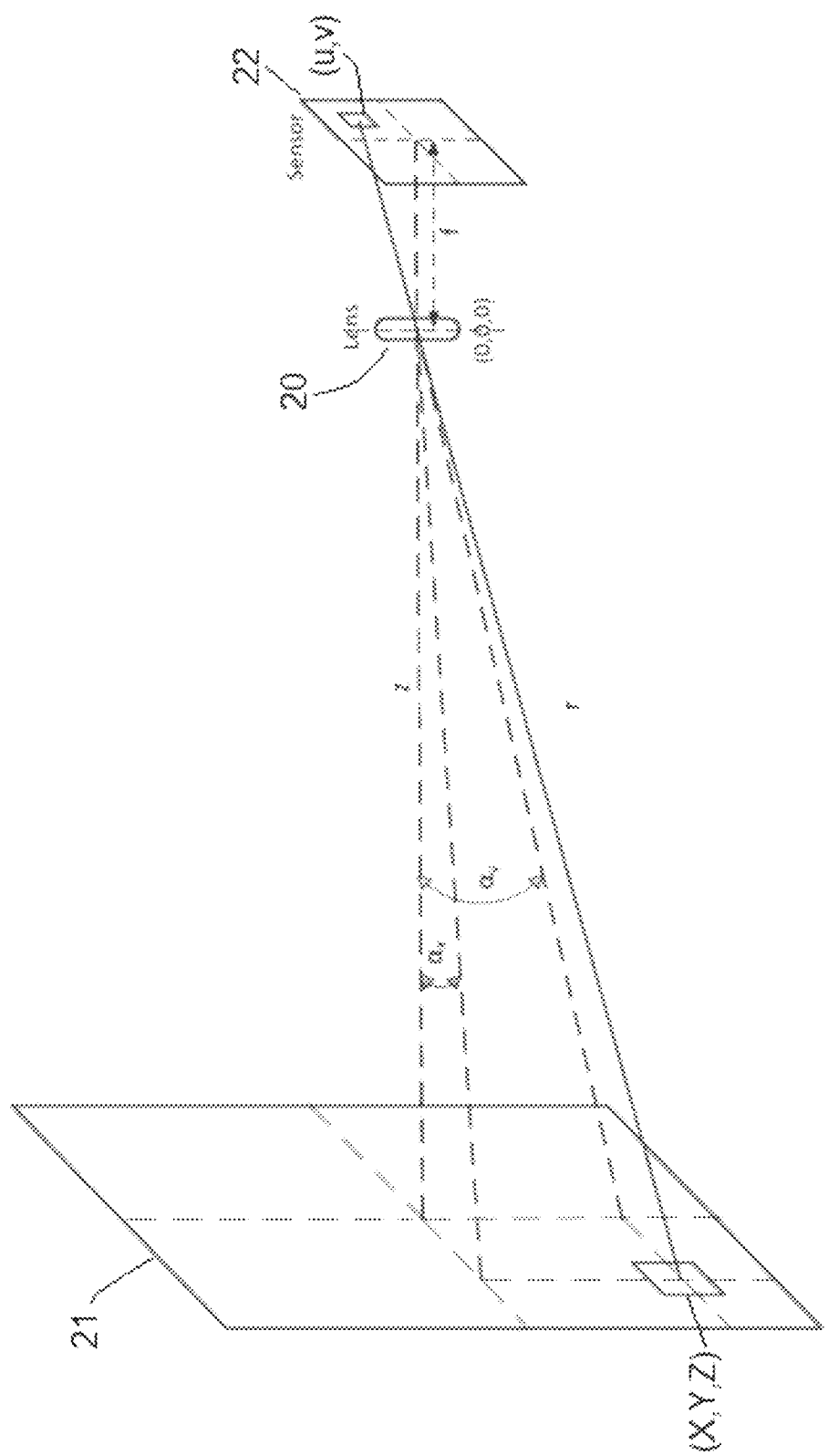
FIG. 2 illustrates a relationship between the depth and the x, y and z coordinates, according to an embodiment of the disclosure.

Exemplary embodiments of the disclosure as described herein generally provide systems and methods for ToF compressed guide down-up sampling. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Embodiments of the disclosure provide methods for low-resolution processing followed by upscaling using a high resolution guide, based on the fact that most natural data is at least piecewise-smooth and renders well to resolution reduction.

According to an embodiment of the disclosure, the output of the sensors is a set of 4 phase measurements that are samples of the correlation of the received signal with a reference signal at different intervals and are images at the original resolution of the sensor. The original, full, resolution can be represented by S, and corresponds to the size of the up-scaled grid on the right side of FIG. 3. For example, if the sensor has a resolution of 480 rows by 640 columns, then S=480×640=307,200. A full resolution Z map is an image, at the original resolution of the sensor, in which each pixel holds the Z coordinate of the part in the scene that this pixel sees, where i, j is the pixel index. Similarly X is an image, at the original resolution of the sensor, in which each pixel holds the X coordinate of the part in the scene that this pixel sees, and the same for Y.

According to an embodiment of the disclosure, the sensor's outputs of 4 phase maps is received and used to calculate a compressed guide. The guide can be any appropriate function of the phases that represents the ToF data and is highly correlated with the depth output. An exemplary such guide function is the intensity:

$$\text{Intensity} = \frac{A_0 + A_{90} + A_{180} + A_{270}}{4}.$$

However, embodiments are not limited thereto. For example, in other embodiments, the guide function could be the amplitude defined above. According to an embodiment, the phase differences are also calculated:

$$I = A_0 - A_{180};$$

$$Q = A_{270} - A_{90}.$$

The Intensity, I and Q maps are originally calculated at the full resolution of the sensor. According to an embodiment, I and Q maps are filtered with a bilateral filter and then down sampled by a factor $\alpha$ at each dimension. A ToF ISP chain according to an embodiment then operates on the down sampled I and Q, performing various processing algorithms such as calibrations, spatial and temporal noise filtering, flying pixels corrections, and ending with a Z coordinate calculation of the observed scene. The runtime of this processing is reduced by the down sampling factor of $\alpha^2$.

Figure 3:
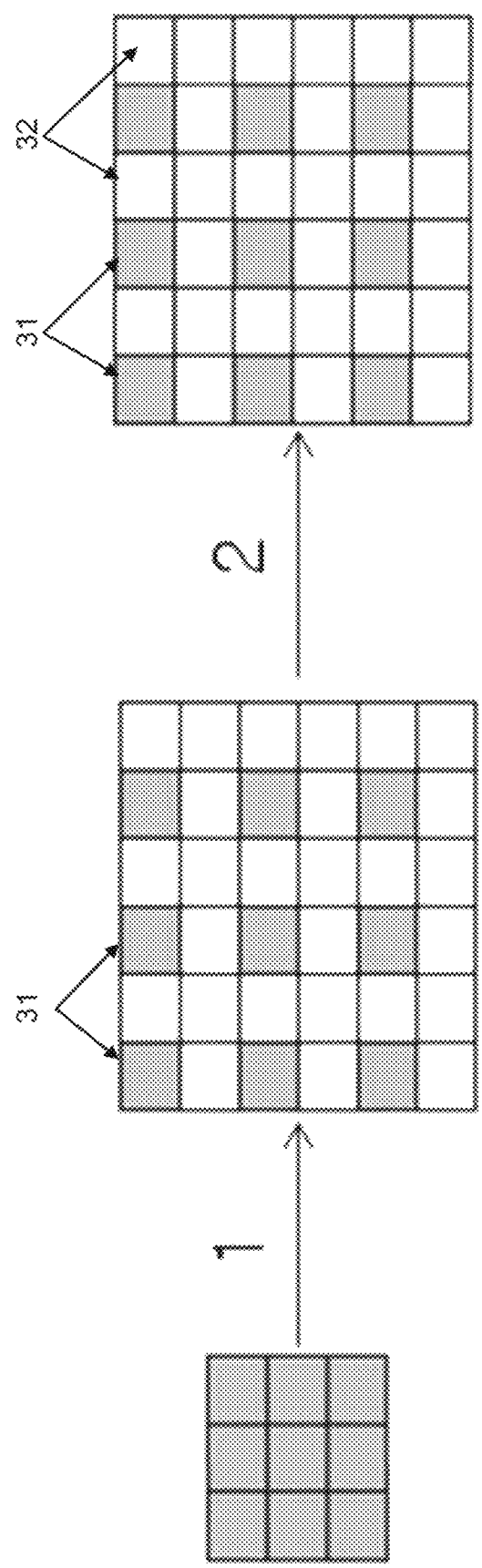
FIG. 3 illustrates a reconstruction flow in a guided up sampling algorithm according to an embodiment of the disclosure.

Then, according to an embodiment, a guided up sampling is performed using the compressed intensity guide on the low resolution Z data to generate a full resolution Z map. FIG. 3 illustrates a guided up sampling algorithm according to an embodiment that reconstructs the Z output. Referring to the figure, a first step 1 is to represent the downscaled Z data in an upscaled grid according to:

$$\hat{Z}[i, j] = z^d\left[\frac{i}{\alpha}, \frac{j}{\alpha}\right],$$

where:
$\hat{Z}$ is the reconstructed Z on the upscaled grid;
$z^d$ is the downscaled Z; and
$\alpha$ is the up/down scaling factor.

According to an embodiment, at a second step 2, a reconstruction is performed according to:

$$\hat{Z}_{i,j} = \frac{\sum_{n \in \text{supp } i} \sum_{m \in \text{supp } j} \hat{Z}_{n,m} W_S(\text{Guide}_{n,m}, \text{Guide}_{i,j}) \text{Mask}_{n,m}}{\sum_{n \in \text{supp } i} \sum_{m \in \text{supp } j} W_S(\text{Guide}_{n,m}, \text{Guide}_{i,j}) \text{Mask}_{n,m}}, \quad (1)$$

where:
supp i denotes the support of index i in the vertical direction and supp j denotes the support of index j in the horizontal direction;
$\hat{Z}_{i,j}$ is the up sampled Z at the pixel (i,j), the white pixels 32 in FIG. 3; note that the grey pixels after stage 1 correspond to the grey pixels after stage 2 but at the second stage the grey pixels from stage one function as the "known data" $\hat{Z}_{n,m}$, while the new data that needs to be reconstructed $\hat{Z}_{i,j}$ are the white pixels;

(n,m) is the index of the downscaled data on the up-scaled grid, in the support of (i,j), (n,m) represents only pixels in the up-scaled grid that contain data from the down-scaled domain, the grey pixels 31 in FIG. 3;

$W_S$ is a similarity weight between pixel (n,m) and pixel (i,j) calculated based on the guide, where in one embodiment, the weights are Gaussian weights defined by the formula $$\exp\left\{\frac{-|\text{Guide}_{n,m} - \text{Guide}_{i,j}|^2}{2\sigma_S^2}\right\},$$

where the standard deviation is proportional to the square root of the intensity, which is an estimate of the noise level under the shot noise assumption, and is scaled by a predetermined tunable factor;

$\text{Guide}_{n,m}$ and $\text{Guide}_{i,j}$ are the guide defined above, at index [n, m] and index [i, j] in the upscaled domain, respectively; and $\text{Mask}_{n,m}$ has values of 1 or 0 and determines whether or not to include pixel (n,m) in the reconstruction of pixel (i,j), based on Z similarities between neighboring pixels or other external information from the ISP. The mask aims to exclude pixels from the averaging so as to not blur the output and not create flying pixels.

According to an embodiment, the Guide is the Intensity function defined above, but embodiments are not limited thereto. The Mask is calculated and updated in different stages in the ISP processing chain: unreliable pixels, with low SNR/amplitude are masked, then a flying pixels correction block updates the mask to mask pixels that were identified as flying pixels but weren't corrected. In the upscaling block, this mask is used and updated based on Z similarities between neighboring pixels that are used for the reconstruction of their neighbor pixel.

Flying pixels are pixels whose depth value is incorrect and far from the value of their neighbors. They are called flying because in a 3D view of the scene, i.e., the point cloud, they appear as "flying" and not related to the objects in the scene. Flying pixels have several causes. For example, if a pixel is "looking" on an area in the scene in which there is an inconsistent transition between depths, i.e., a transition between two objects at different distances from the sensor, then the pixel will receive a mixture of signals from the two different distances and thus it will have a wrong depth value. In addition, filtering can cause flying pixels. If two pixels from different surfaces at different distances are averaged, then the result will be a wrong depth. Flying pixels can occur if Z values of pixels of different objects at different distances are averaged in the interpolation, as the Z result will be a mixture of the Z values of the neighbors, which will appear as a flying pixel.

Figure 4:
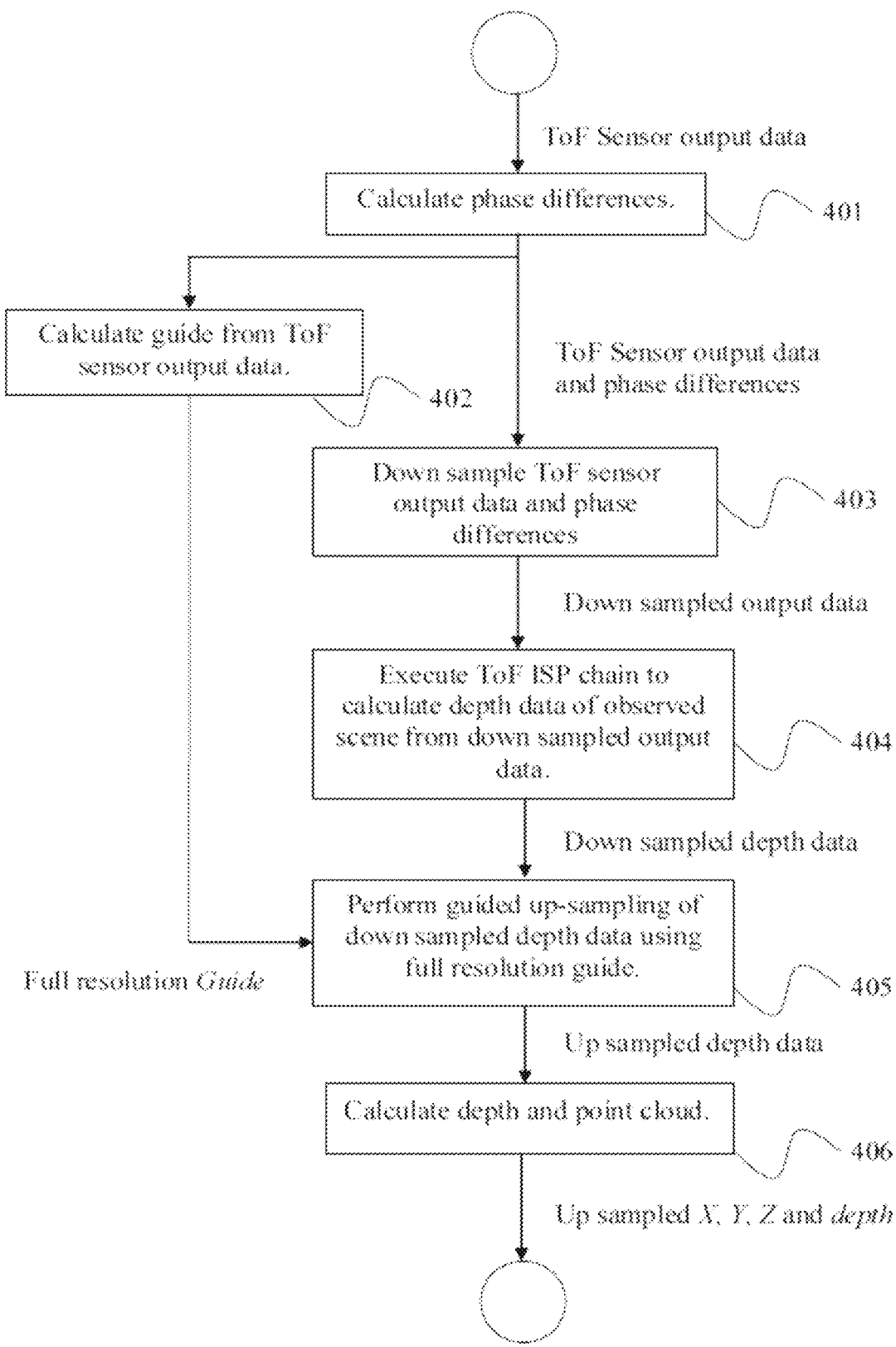
FIG. 4 is a flow chart of a ToF compressed guide down-up sampling algorithm according to an embodiment of the disclosure.

FIG. 4 is a flow chart of a ToF compressed guide down-up sampling algorithm according to an embodiment of the disclosure. Referring to the figure, and given the ToF sensor's output data of $A_0$, $A_{90}$, $A_{180}$ and $A_{270}$ for each pixel, a data set of size 4×S, an optional first step 401 is to calculate the phase differences I and Q may also be calculated from the sampled phases. At step 402, the guide function is calculated from the ToF sensor output data at the full resolution S. An exemplary guide function is the Intensity function. The ToF sensor output data and phase differences are passed to a next step 403, where the ToF sensor output data and phase differences are downsampled by a factor of α. The ToF sensor output data and phase differences may also be filtered before the down sampling to reduce aliasing. An exemplary noise-reducing smoothing filter is the bilateral filter. The output is down sampled output data, which has resolution $$\frac{S}{a^2},$$

and is passed to a next step 404, to be processed by the ISP chain. The ISP chain calculates depth data from the down sampled output data, which has resolution $$\frac{S}{a^2}.$$

The depth data may be, for example, one or more of the spherical depth, the Cartesian coordinates X, Y, and Z, or the Mask. The depth data are passed to a next step 405, where guided up sampling is performed, as guided by the full resolution guide function received from step 402. The up sampled depth data is calculated, based on EQ. (1), above, where the weights $W_s$ are calculated based on the full resolution guide. The up sampled depth data has the original resolution, S, and is passed to the next step 406 for the point cloud and depth calculations. The output of step 406 include X, Y, Z and depth, for a total resolution of 4×S.

Methods according to embodiments of the disclosure can reduce the ToF runtime by the factor of the down-sampling. However, high frequency features can be retrieved by using the original resolution compressed or sparse information to assist the up scaling process. The compressed guide eliminates the need to save the original data throughout the ISP chain. Embodiments of the disclosure provide a unique solution for runtime and power reduction in ToF systems, considering ToF sensitivity to depth and point cloud artifacts. A method according to an embodiment has a negligible amount of ToF artifacts, such as flying pixels, and uses correlations between the raw input and depth to retrieve details.

It is to be understood that embodiments of the present disclosure can be implemented in various forms of hardware, software, firmware, special purpose processes, or a combination thereof. In some embodiments, the present disclosure can be implemented in hardware as an application-specific integrated circuit (ASIC), or as a field programmable gate array (FPGA). In other embodiments, the present disclosure can be implemented in software as an application program tangible embodied on a computer readable program storage device. The application program can be uploaded to, and executed by, a machine comprising any suitable architecture.

Figure 5:
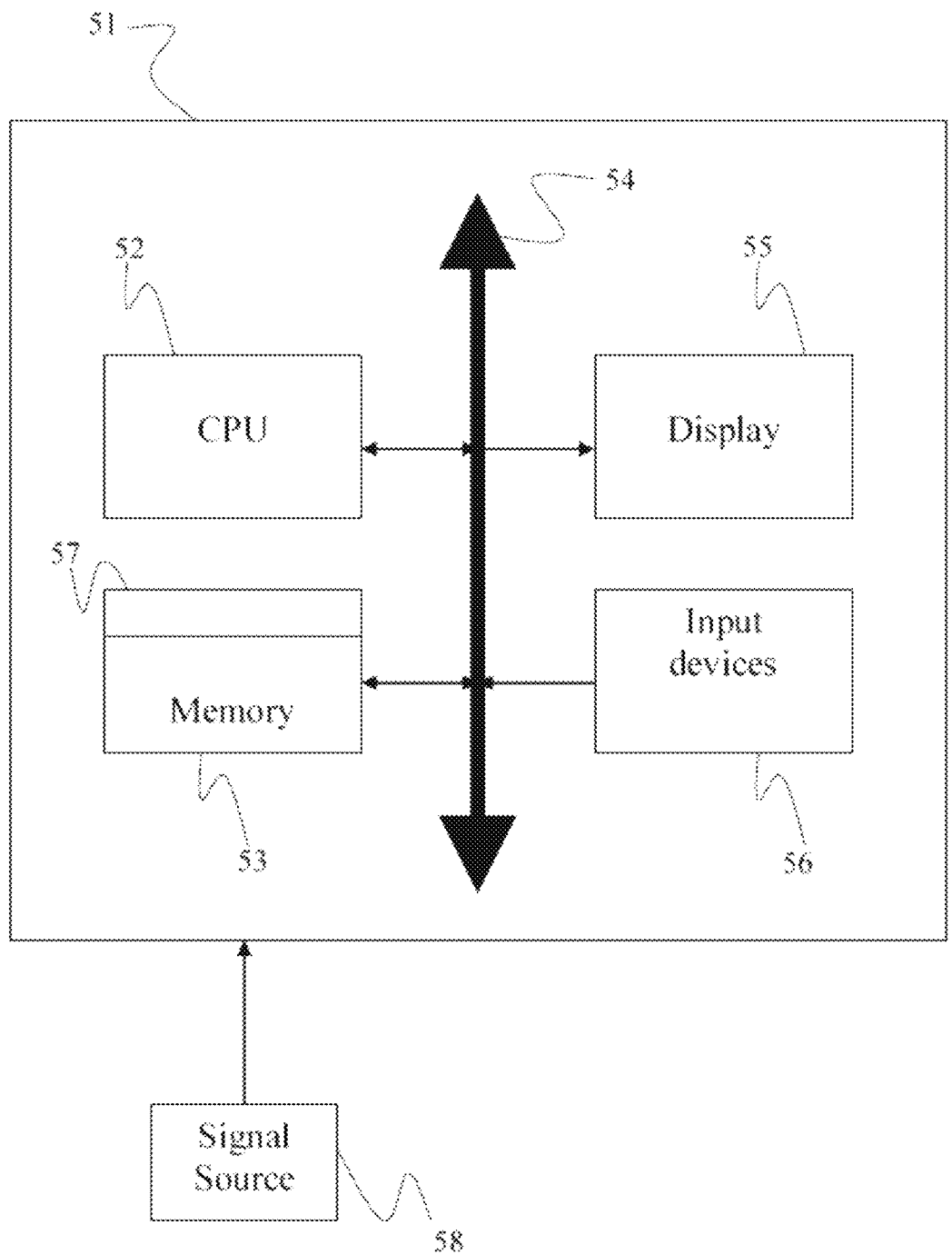
FIG. 5 is a block diagram of a system that implements a method for ToF compressed guide down-up sampling, according to an embodiment of the disclosure.

FIG. 5 is a block diagram of a system that implements a method for ToF compressed guide down-up sampling according to an embodiment of the disclosure. Referring now to FIG. 5, a computer system 51 for implementing the present invention can comprise, inter alia, a processor 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The processor 52 may be a graphics processing unit (GPU), a neural processor or dedicated hardware (HW). A GPU and a neural processor are suitable for running a deep neural network, while a GPU and dedicated HW are good matches for the registration and MC-FI modules according to embodiments. The memory 53 can include random access memory (RAM), read only memory (ROM), disk drive, tape drive, etc., or a combinations thereof. The present disclosure can be implemented as a routine 57 that is stored in memory 53 and executed by the processor 52. As such, the computer system 51 is a general purpose computer system that becomes a specific purpose computer system when executing the routine 57 of the present invention. Alternatively, as described above, embodiments of the present disclosure can be implemented as an ASIC or FPGA 57 that is in signal communication with the processor 52.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for time-of-flight (ToF) guide down-up sampling, the method comprising the steps of:
   calculating a guide function from a full resolution output of a ToF sensor;
   downsampling the full resolution output by a predetermined sealing factor;
   calculating a downsampled depth data from the downsampled output; and
   upsampling the downsampled depth data to full resolution using the full resolution guide function,
   wherein the full resolution output includes a set of phase measurements $A_0$, $A_{90}$, $A_{180}$ and $A_{270}$ that are samples of a correlation of a received signal and a reference signal, and are represented as four images at the full resolution output of the ToF sensor.

2. The method of claim 1, further comprising filtering the full resolution output.

3. The method of claim 1, further comprising:
   processing the downsampled output in an image signal processing (ISP) chain; and
   calculating a full resolution point cloud from the full resolution depth data.

4. The method of claim 1, further comprising calculating first and second phase differences from the full resolution output, wherein the guide function is defined as $$\frac{A_0 + A_{90}A_{180} + A_{270}}{4},$$

the first phase difference is defined as $A_{270}-A_{90}$ and the second phase difference is defined as $A_0-A_{180}$.

5. The method of claim 1, wherein upsampling the downsampled depth data to full resolution comprises:
  representing the downscaled depth data in an upscaled domain according to $$\hat{Z}[i, j] = z^d\left[\frac{i}{a}, \frac{j}{a}\right],$$

wherein $\hat{Z}$ is the depth data on the upscaled domain, $z^d$ is the downscaled depth data, and $\alpha$ is the down-up sampling factor; and
  reconstructing the full resolution depth data according to $$\hat{Z}_{i,j} = \frac{\sum_{n\in supp\ i}\sum_{m\in supp\ j}\hat{Z}_{n,m}W_S(Guide_{n,m}, Guide_{i,j})Mask_{n,m}}{\sum_{n\in supp\ i}\sum_{m\in supp\ j}W_S(Guide_{n,m}, Guide_{i,j})Mask_{n,m}},$$

wherein supp i denotes a support of index i in a vertical direction, supp j denotes a support of index j in a horizontal direction, $\hat{Z}_{i,j}$ is the up sampled depth data at pixel (i,j) on the up sampled domain,
  (n,m) is an index of the downscaled depth data on the upscaled domain in the support of (i,j),
  $W_S$ is a similarity weight between pixel (n,m) and pixel (i,j) calculated based on the guide function, $Guide_{n,m}$ and $Guide_{i,j}$ are the guides for pixel (n,m) and pixel (i,j), respectively, in the upscaled domain, and $Mask_{n,m}$ has values of 1 or 0 and determines whether or not to include a down sampled pixel (n,m) in the reconstruction of pixel (i,j).

6. The method of claim 5, wherein the weights $W_S$ ($Guide_{n,m}$, $Guide_{i,j}$) are Gaussian functions defined by the formula $$\exp\left\{\frac{-|Guide_{n,m} - Guide_{i,j}|^2}{2\sigma_S^2}\right\},$$

wherein $\sigma$ is proportional to a square root of $A_0+A_{90}+A_{180}+A_{270}$ and sealed by a predetermined tunable factor.

7. The method of claim 5, wherein $Mask_{n,m}$ is calculated based on depth similarities between adjacent pixels or other external information, wherein $Mask_{n,m}$ eliminates unreliable and flying pixels from the reconstruction of the full resolution depth data.

8. The method of claim 1, wherein the depth data is one of a spherical depth, Cartesian coordinates, or a mask.

9. A method for time-of-flight (ToF) guided down-up sampling, the method comprising the steps of:
  providing downsampled depth data from first and second phase differences calculated from a full resolution output of a ToF sensor; and
  upsampling the downsampled depth data to full resolution using a full resolution guide function calculated from the full resolution output of a ToF sensor, wherein upsampling the downsampled depth data to full resolution comprises:
  representing the downscaled depth data in an upscaled domain according to $$\hat{Z}[i, j] = z^d\left[\frac{i}{a}, \frac{j}{a}\right],$$

wherein $\hat{Z}$ a depth on the upscaled domain, $z^d$ is a downscaled depth, and $\alpha$ is a down-up sampling factor; and
  reconstructing the full resolution depth data according to $$\hat{Z}_{i,j} = \frac{\sum_{n\in supp\ i}\sum_{m\in supp\ j}\hat{Z}_{n,m}W_S(Guide_{n,m}, Guide_{i,j})Mask_{n,m}}{\sum_{n\in supp\ i}\sum_{m\in supp\ j}W_S(Guide_{n,m}, Guide_{i,j})Mask_{n,m}},$$

wherein supp i denotes a support of index i in a vertical direction, supp j denotes a support of index j in a horizontal direction, $\hat{Z}_{i,j}$ is an up sampled depth at pixel (i,j),
  (n,m) is an index of downscaled depth data on the upscaled domain in the support of (i,j),
  $W_S$ is a similarity weight between pixel (n,m) and pixel (i,j) calculated based on the guide function, $Guide_{n,m}$ and $Guide_{i,j}$ are the guides for pixel (n,m) and pixel (i,j), respectively, in the upscaled domain, and $Mask_{n,m}$ has values of 1 or 0 and determines whether or not to include a down sampled pixel (n,m) in the reconstruction of pixel (i,j).

10. The method of claim 9, wherein the full resolution output of the ToF sensor includes a set of phase measurements $A_0$, $A_{90}$, $A_{180}$, and $A_{270}$ that are samples of a correlation of a received signal and a reference signal, and are represented as four images at the full resolution output of the ToF sensor.

11. The method of claim 10, further comprising:
  calculating the guide function and first and second phase differences from the full resolution output of the ToF sensor, wherein the guide function is defined as $$\frac{A_0 + A_{90}A_{180} + A_{270}}{4},$$

the first phase difference is defined as $A_{270}-A_{90}$ and the second phase difference is defined as $A_0-A_{180}$;
  downsampling the first and second phase differences by the predetermined scaling factor; and
  calculating the downsampled depth data from the downsampled first and second phase differences.

12. The method of claim 9, further comprising calculating a full resolution point cloud from the full resolution depth data.

13. A non-transitory program storage device readable by a computer, tangibly embodying a program of instructions executed by the computer to perform a method for time-of-flight (ToF) guided down-up sampling, wherein the method comprises the steps of:
  receiving a set of hill resolution ToF phase measurements $A_0, A_{90}, A_{180}$, and $A_{270}$ that are samples of a correlation of a received signal and a reference signal, and are represented as four images;

calculating a guide function and first and second phase differences from the fall resolution phase measurements output by the ToF sensor;

downsampling the first and second phase differences by a predetermined scaling factor;

calculating downsampled depth data from the downsampled first and second phase differences; and up sampling the downsampled depth data to full resolution using the guide function.

14. The computer readable program storage device of claim 13, wherein the method further comprises filtering said full resolution first and second phase differences.

15. The computer readable program storage device of claim 13, wherein the method further comprises calculating a full resolution point cloud from the full resolution depth data.

16. The computer readable program storage device of claim 12, wherein the set of phase measurements $A_0$, $A_{90}$, $A_{180}$, and $A_{270}$ are sampled at 0°, 90°, 180° and 270°, the guide function is defined as $$\frac{A_0 + A_{90} A_{180} + A_{270}}{4},$$

the first phase difference is defined as $A_{270}-A_{90}$ and the second phase difference is defined as $A_0-A_{180}$.

17. The computer readable program storage device of claim 13, wherein upsampling the downsampled depth data to full resolution comprises:

representing the downscaled depth data in an upscaled domain according to $$\hat{Z}[i, j] = z^d\left[\frac{i}{a}, \frac{j}{a}\right],$$

wherein $\hat{Z}$ is a depth on the upscaled domain, $z^d$ is a downscaled depth, and $\alpha$ is the down-up sampling factor; and reconstructing the full resolution death data according to $$\hat{Z}_{i,j} = \frac{\sum_{n\in supp\ i}\sum_{m\in supp\ j}\hat{Z}_{n,m}W_S(Guide_{n,m}, Guide_{i,j})Mask_{n,m}}{\sum_{n\in supp\ i}\sum_{m\in supp\ j}W_S(Guide_{n,m}, Guide_{i,j})Mask_{n,m}},$$

wherein supp i denotes a support of index i in a vertical direction, supp j denotes a support of index j in a horizontal direction, $\hat{Z}_{i,j}$ is the tip sampled depth at pixel (i,j), (n,m) is an index of the downscaled depth data on the upscaled domain in the support of (i,j), $W_S$ is a similarity weight between pixel (n,m) and pixel (i,j) calculated based on the guide function, $Guide_{n,m}$ and $Guide_{i,j}$ are the guides for pixel (n,m) and pixel (i,j), respectively, in the upscaled domain, and $Mask_{n,m}$ has values of 1 or 0 and determines whether or not to include a down sampled pixel (n,m) in the reconstruction of pixel (i,j).

18. The computer readable program storage, device of claim 17, wherein the weights $W_S$ ($Guide_{n,m}$, $Guide_{i,j}$) are Gaussian functions defined by the formula $$\exp\left\{\frac{-|Guide_{n,m} - Guide_{i,j}|^2}{2\sigma_S^2}\right\},$$

wherein σ is proportional to a square root of $A_0+A_{90}+A_{180}+A_{270}$ and scaled by a predetermined tunable factor.

19. The computer readable program storage device of claim 17, wherein $Mask_{n,m}$ is calculated based on depth similarities between adjacent pixels or other external information, wherein $Mask_{n,m}$ eliminates unreliable and flying pixels from the reconstruction of the full resolution depth data.

\* \* \* \* \*